United States Patent
Khanagha et al.

(10) Patent No.: US 10,530,936 B1
(45) Date of Patent: Jan. 7, 2020

(54) METHOD AND SYSTEM FOR ACOUSTIC FEEDBACK CANCELLATION USING A KNOWN FULL BAND SEQUENCE

(71) Applicant: MOTOROLA SOLUTIONS, INC., Chicago, IL (US)

(72) Inventors: Vahid Khanagha, Sunrise, FL (US); Kurt S. Fienberg, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/354,565

(22) Filed: Mar. 15, 2019

(51) Int. Cl.
  *H04M 9/08* (2006.01)
  *H04R 3/04* (2006.01)
  *G10L 25/21* (2013.01)
  *H04R 3/02* (2006.01)

(52) U.S. Cl.
  CPC ............ *H04M 9/085* (2013.01); *G10L 25/21* (2013.01); *H04R 3/02* (2013.01); *H04R 3/04* (2013.01)

(58) Field of Classification Search
  CPC ......... G10K 11/1784; G10K 11/17827; G10K 11/17883; H04R 3/04; H04R 29/002; H04R 1/403; H04R 5/04; H04R 5/027
  USPC ............... 455/570; 181/145; 381/71.6, 71.11
  See application file for complete search history.

(56) References Cited

U.S. PATENT DOCUMENTS

| | | |
|---|---|---|
| 4,449,237 A | 5/1984 | Stepp et al. |
| 4,525,856 A | 6/1985 | Admiraal et al. |
| 5,259,033 A | 11/1993 | Goodings et al. |
| 5,271,057 A | 12/1993 | Addeo et al. |
| 5,386,465 A | 1/1995 | Addeo et al. |
| 6,072,884 A | 6/2000 | Kates |
| 7,010,098 B2 | 3/2006 | Moquin et al. |
| 7,068,798 B2 | 6/2006 | Hugas et al. |
| 7,184,790 B2 | 2/2007 | Dorenbosch et al. |

(Continued)

FOREIGN PATENT DOCUMENTS

| | | |
|---|---|---|
| WO | 2010080374 | 7/2010 |
| WO | 2014094242 | 6/2014 |

OTHER PUBLICATIONS

Waterschoot, "Fifty Years of Acoustic Feedback Control: State of the Art and Future Challenges," in Proceedings of the IEEE, vol. 99, No. 2, pp. 288-327 (2011) doi: 10.1109/JPROC.2010.2090998.

(Continued)

*Primary Examiner* — Phuoc H Doan
(74) *Attorney, Agent, or Firm* — Michael Best & Friedrich LLP

(57) ABSTRACT

Systems and methods for acoustic feedback cancellation. One method includes transmitting, with a transceiver, a known full-band sequence at a first time. The method includes receiving, via a microphone, a received audio signal including a received copy of the known full-band sequence. The method includes filtering the received audio signal to generate a filtered audio signal, and detecting, based on the filtered audio signal, a second portable communication device in proximity to the portable communication device. The method includes, in response to detecting the second portable communication device, determining, based on the first time and filtered audio signal, an estimated loop delay. The method includes initializing an adaptive feedback cancellation filter based on the estimated loop delay and the plurality of estimated filter coefficients. The method includes determining a plurality of estimated filter coefficients based on the known full-band sequence and the received copy of the known full-band sequence.

18 Claims, 12 Drawing Sheets

(56) References Cited

U.S. PATENT DOCUMENTS

| | | |
|---|---|---|
| 8,630,426 B2 | 1/2014 | Svendsen |
| 9,667,284 B1 | 5/2017 | Gean et al. |
| 2006/0140429 A1 | 6/2006 | Klinkby et al. |
| 2007/0172080 A1 | 7/2007 | Janse et al. |
| 2012/0214416 A1 | 8/2012 | Kent et al. |
| 2013/0297690 A1 | 11/2013 | Lucero et al. |

OTHER PUBLICATIONS

Waterschoot, "On the performance of decorrelation by prefiltering for adaptive feedback cancellation in public address systems," in Proceedings of the IEEE Benelux Signal Processing Symposium (2004) Hilvarenbeek, the Netherlands, Apr. 15-16, 2004, pp. 167-170.

METHOD AND SYSTEM FOR ACOUSTIC FEEDBACK CANCELLATION USING A KNOWN FULL BAND SEQUENCE

BACKGROUND OF THE INVENTION

Wireless communication systems, for example, half-duplex communication systems, may experience problems when a receiving communication device is operating in proximity to a transmitting communication device. For example, a microphone of the transmitting communication device may receive an acoustic feedback signal generated by a speaker of the receiving communication device. The acoustic feedback signal may continue to circulate and grow in a regenerative signal loop leading to a phenomenon known as howling. When howling occurs desired communications are often drowned out or otherwise obfuscated.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
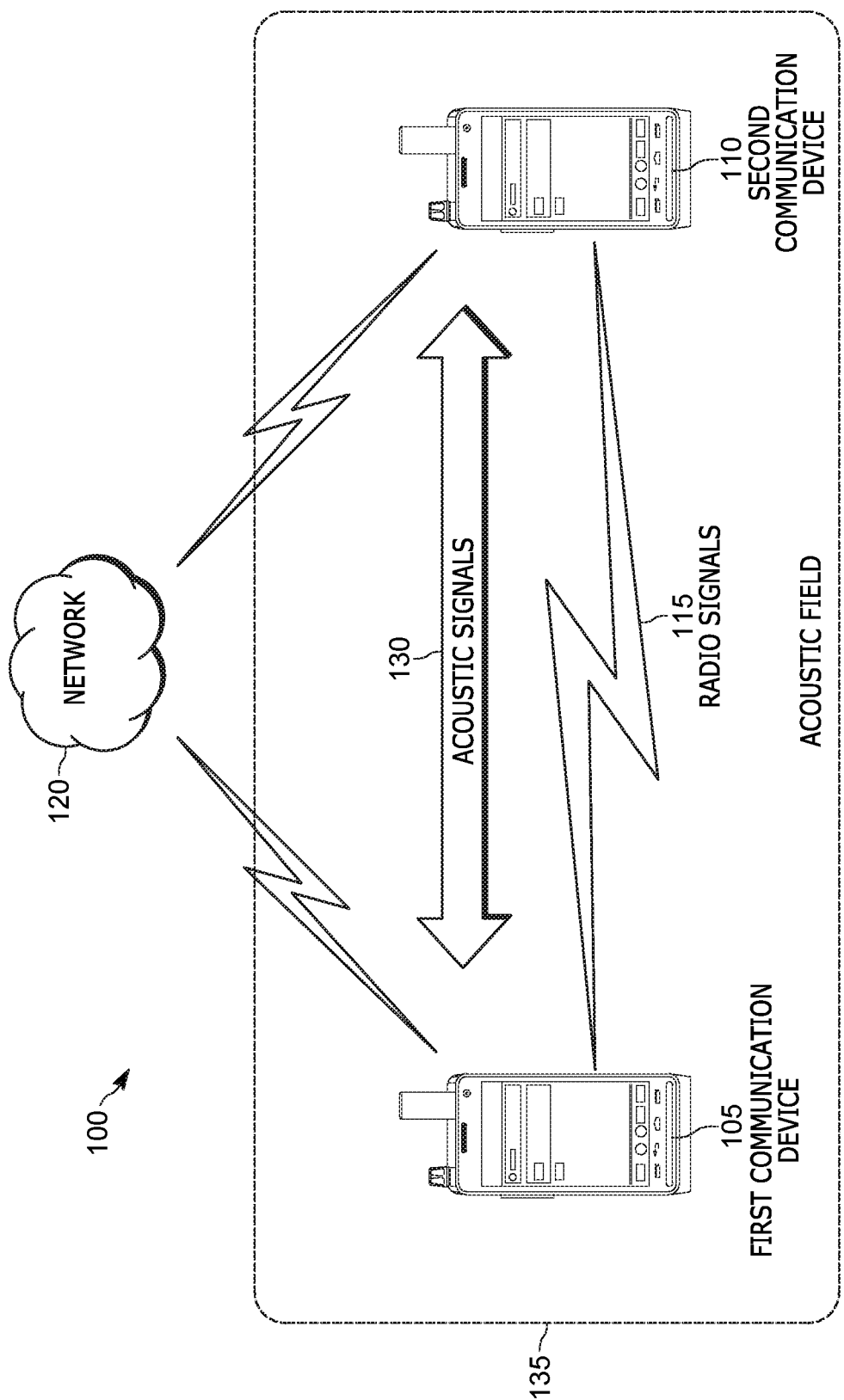
FIG. 1 is a diagram of a communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, the use of audio communication devices near one another can lead to acoustic feedback loops known as howling. To reduce howling, the feedback loop must be prevented, interrupted, or otherwise diminished. For example, one way to stop howling is to stop transmissions from the transmitting communication device. However, ceasing transmission has the same effect as the howling condition: preventing communication between the transmitting user and the receiving user. Another approach to preventing howling is to reduce or eliminate the acoustic feedback source. For example, the distance between the transmitting device and the source of the acoustic feedback could be increased until the sound level from the audio feedback source is too low to generate an acoustic feedback loop. However, this may not be possible when the users of both devices need to work in proximity to one another (for example, when public safety personnel are responding to an emergency situation). To prevent or reduce howling while addressing these problems, some devices incorporate acoustic feedback cancellation (AFC).

Some current methods for acoustic feedback cancellation use adaptive filtering techniques. Such techniques use the originally transmitted audio signal as a reference fed to an adaptive filter to estimate the acoustic feedback signal. The estimated feedback signal is subtracted from the microphone signal to suppress the acoustic feedback, which prevents the formation of a regenerative signal loop. However, the length and variance of the feedback signal delay increase the size of the filters required to estimate a feedback signal. Longer filters increase computational load and they cannot be feasibly implemented in a communication device's hardware. Another challenge to adaptive filtering is the high level of correlation between the undesired acoustic feedback signal and the desired local audio signal produced by the microphone. Correlation can lead to adaptation bias, which hinders accurate estimation of the feedback signal and may introduce additional distortion to the transmitted audio. Finally, some adaptive filters do not converge fast enough to prevent the build-up of howling. The communication device may not be able to estimate the feedback signal before it is needed to suppress the received acoustic feedback. Accordingly, systems and methods are provided herein for, among other things, acoustic feedback cancellation using known full band audio sequences.

One example embodiment provides a portable communication device. The portable communication device includes a transceiver, a microphone, an adaptive feedback cancellation filter, and an electronic processor coupled to the transceiver, the microphone, and the adaptive feedback cancellation filter. The electronic processor is configured to control the transceiver to transmit a known full-band sequence at a first time. The electronic processor is configured to receive, via the microphone, a received audio signal including a received copy of the known full-band sequence. The electronic processor is configured to filter the received audio signal to generate a filtered audio signal. The electronic processor is configured to detect, based on the filtered audio signal, a second portable communication device in proximity to the portable communication device. The electronic processor is configured to, in response to detecting the second portable communication device, determine, based on the first time and filtered audio signal, an estimated loop delay. The electronic processor is configured to initialize the adaptive feedback cancellation filter based on the estimated loop delay and the plurality of estimated filter coefficients. The electronic processor is configured to determine a plurality of estimated filter coefficients based on the known full-band sequence and the received copy of the known full-band sequence.

Another example embodiment provides a method for acoustic feedback cancellation. The method includes transmitting, with a transceiver, a known full-band sequence at a first time. The method includes receiving, via a microphone, a received audio signal including a received copy of the known full-band sequence. The method includes filtering the received audio signal to generate a filtered audio signal. The method includes detecting, based on the filtered audio signal, a second portable communication device in proximity to the portable communication device. The method includes, in response to detecting the second portable communication device, determining, with an electronic processor based on the first time and filtered audio signal, an estimated loop delay. The method includes initializing an adaptive feedback cancellation filter based on the estimated loop delay and the plurality of estimated filter coefficients. The method includes determining, with the electronic processor, a plurality of estimated filter coefficients based on the known full-band sequence and the received copy of the known full-band sequence.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 illustrates an example communication system 100. The communication system 100 includes two portable communication devices: a first communication device 105 and a second communication device 110. The first communication device 105 and the second communication device 110, both described more particularly below with respect to FIG. 2, transmit and receive voice and data to each other and to other communication devices (not shown) using radio frequency signals 115. In some embodiments, the first communication device 105 and the second communication device 110 are communicatively coupled via a network 120. The network 120 is an electronic communications network including wireless and wired connections. The network 120 may be implemented using a wide area network, for example, the Internet, a local area network, for example, a Wi-Fi network, and a near-field or personal area network, for example, a Bluetooth™ network. Other networks, for example, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, and combinations or derivatives thereof may also be used. In some embodiments, the network 120 includes a land mobile radio (LMR) network. For ease of description, only two communication devices are illustrated in FIG. 1. Some embodiments of the communication system 100 include additional electronic communication devices, which may communicate to one another directly, over the network 120, or both.

In some embodiments, the first communication device 105 and the second communication device 110 provide push-to-talk functionality. Push-to-talk is a method of transmitting audio communications over a half-duplex communication channel. In some embodiments, the network 120 includes hardware and software suitable for assigning the first communication device 105, the second communication device 110, other communication devices (not shown), or combinations thereof to one or more talk groups and facilitating communications therebetween. For example, the network 120 may, upon receiving a request from one of the communication devices, establish push-to-talk channels between two or more communication devices based on talk group identifiers, device identifiers, or both. In some embodiments, push-to-talk communications occur directly between the communication devices without the involvement of the network 120.

As illustrated in FIG. 1, the first communication device 105 and the second communication device 110 may be handheld communication devices, for example, mobile telephones (including smart telephones), portable two-way radios, converged devices including cellular and land mobile radio communications, smart watches or other smart wearables, or other portable electronic devices configured to communicate with each other directly or over the network 120. The first communication device 105, the second communication device 110, or both may alternatively be a communication device installed in a vehicle. For example, in some embodiments, the first communication device 105 may be a handheld communication device carried by public safety personnel, for example, police officers. The second communication device 110 may be a communication device installed in a public safety vehicle, for example, a police vehicle. In another example, the first communication device 105 may be a smart telephone, and the second communication device 110 may be a landline speakerphone. Accordingly, the first communication device 105 and the second communication device 110 may be any type of communication device capable of operating as described herein. In some embodiments, the first communication device 105 and the second communication device 110 may be different types of communication devices.

As described in more detail below, the first communication device 105 and the second communication device 110 also produce an acoustic signal 130 (for example, audible signals from a speaker). As illustrated in FIG. 1, the first communication device 105 and the second communication device 110 may operate within the same acoustic field 135. The acoustic field 135 is an area, within which the microphone of one of the communication devices is capable of detecting the acoustic signal 130 produced by a loudspeaker of the other communication device. The acoustic field 135 exists within a physical environment, and accordingly has acoustic characteristics. The acoustic field 135 may be in an open area (for example, the outdoors), an enclosed area (for example, a room or a vehicle), or a partially enclosed area (for example, a large indoor space). The physical environment of the acoustic field 135 may also include objects or structures that reflect sound waves.

In some situations, when the first communication device 105 is in proximity to the second communication device 110 and the first communication device 105 is transmitting audio to the second communication device 110, the first communication device 105 may receive acoustic feedback from the audio produced by the second communication device 110. In some instances, acoustic feedback may continue to circulate and grow in an unstable loop, leading to howling. Accordingly, as described in detail below, the first communication device 105 includes hardware and software for cancelling acoustic feedback.

Figure 2:
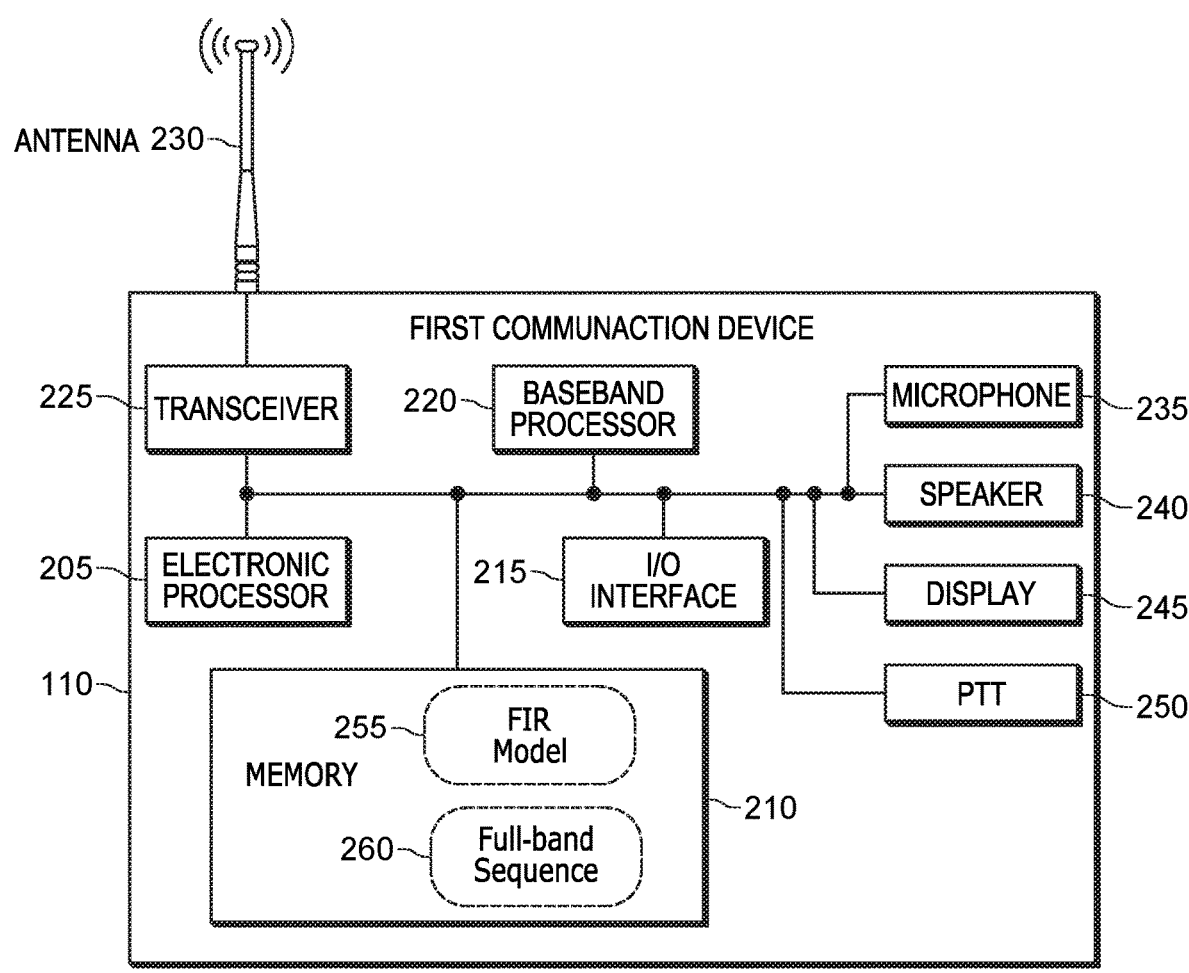
FIG. 2 is a diagram of a communication device included in the communication system of FIG. 1, in accordance with some embodiments.

FIG. 2 is a diagram of an example first communication device 105. In the embodiment illustrated, the first communication device 105 includes an electronic processor 205, a memory 210, an input/output interface 215, a baseband processor 220, a transceiver 225, an antenna 230, microphone 235, a loudspeaker 240, a display 245, and a push-to-talk (PTT) selection mechanism 250. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. In some embodiments, the first communication device 105 includes fewer or additional components in configurations different from that illustrated in FIG. 2. For example, in some embodiments, the first communication device 105 includes multiple microphones, multiple speakers, or combinations thereof. In some embodiments, the first communication device 105 lacks a display 245.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein. The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, a finite impulse response (FIR) model 255 and a full-band audio sequence 260 (each described in detail below).

The input/output interface 215 is configured to receive input and to provide system output. The input/output interface 215 obtains information and signals from, and provides information and signals to, (for example, over one or more wired and/or wireless connections) devices both internal and external to the first communication device 105.

The electronic processor 205 is configured to control the baseband processor 220 and the transceiver 225 to transmit and receive radio frequency signals (for example, encoded with audio) to and from the first communication device 105. The baseband processor 220 encodes and decodes digital data (including digitized audio signals) sent and received by the transceiver 225. The transceiver 225 transmits and receives radio signals to and from, for example, the network 120 using the antenna 230. The electronic processor 205, the baseband processor 220, and the transceiver 225 may include various digital and analog components (for example, digital signal processors, high band filters, low band filters, and the like), which for brevity are not described herein and which may be implemented in hardware, software, or a combination of both. In some embodiments, the transceiver 225 includes a combined transmitter-receiver component. In other embodiments, the transceiver 225 includes separate transmitter and receiver components.

The microphone 235 is a transducer capable of sensing sound, converting the sound to electrical signals, and transmitting the electrical signals to the electronic processor 205. The electronic processor 205 processes the electrical signals received from the microphone 235 to produce an audio signal, which may be transmitted to other devices via the transceiver 225. The loudspeaker 240 is a transducer for reproducing sound from electrical signals (for example, generated from a received audio signal) received from the electronic processor 205. The microphone 235 and the loudspeaker 240 support both audible and inaudible frequencies. In some embodiments, the microphone 235, the loudspeaker 240, or both may be integrated in a single housing with the other components (for example, in a portable hand-held radio). In some embodiments, the microphone 235, the loudspeaker 240, or both are present in an accessory device (for example, a remote speaker microphone (RSM)) connect via a wired or wireless connection to the first communication device 105.

The display 245 is a suitable display, for example, a liquid crystal display (LCD) touch screen, or an organic light-emitting diode (OLED) touch screen. In some embodiments, the first communication device 105 implements a graphical user interface (GUI) (for example, generated by the electronic processor 205, from instructions and data stored in the memory 210, and presented on the display 245), that enables a user to interact with the first communication device 105.

The push-to-talk selection mechanism 250 allows a user of the first communication device 105 to initiate push-to-talk half-duplex voice communications to one or more other communication devices, either directly or over the network 120. For example, when the electronic processor 205 detects that the push-to-talk selection mechanism 250 is enabled, the electronic processor 205 controls the transceiver 225 to transmit signals created by sound detected by the microphone 235 (for example, as a half-duplex communication signal). When the electronic processor 205 detects that the push-to-talk selection mechanism 250 is no longer enabled (for example, has been released), the transceiver 225 stops transmitting the signals. In some embodiments, the push-to-talk selection mechanism 250 is a mechanical button, key, switch, or knob. In some embodiments, the push-to-talk selection mechanism 250 is provided as part of a graphical user interface (for example, a virtual button) presented on the display 245.

The second communication device 110 includes similar components as described above, and is configured similarly to the first communication device 105. In some embodiments, the second communication device 110 is identical to the first communication device 105.

Figure 3:
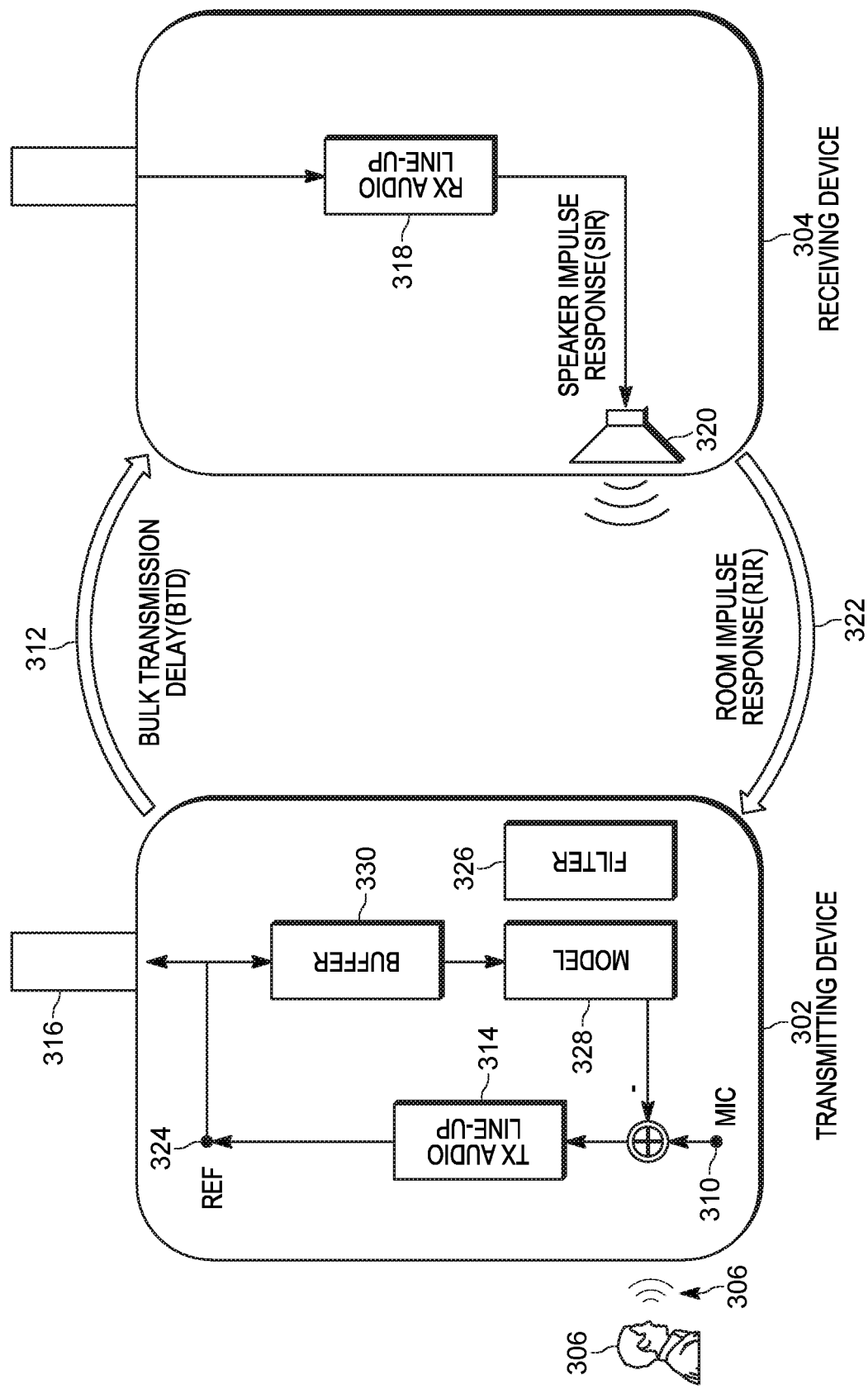
FIG. 3 is a diagram illustrating an acoustic feedback cancellation process, in accordance with some embodiments.

In some situations, when the first communication device 105 operates in close proximity to the second communication device 110, acoustic feedback may occur. FIG. 3 illustrates an example of acoustic feedback between two communication devices (a transmitting communication device 302 and a receiving communication device 304). The transmitting communication device 302 and the receiving communication device 304 may each include similar components as and operate similarly to the first communication device 105 (see FIG. 2).

As illustrated in FIG. 3, a user 306 of the transmitting communication device 302 generates a speech signal 308 (that is, an acoustic signal), which is picked up by the microphone 310 of the transmitting communication device 302. The microphone 310 transduces the speech signal 308 into an audio signal. The transmitting communication device 302 transmits the audio signal to the receiving communication device 304 (via a radio frequency signal 312) using the transmit audio path 314 (including, for example, a transceiver, amplifiers, filters, and the like) and an antenna 316. The receiving communication device 304 receives the radio frequency signal 312, decodes the audio signal using the receive audio path 318, and broadcasts the audio signal using a speaker 320 to produce an acoustic signal 322. When the two communication devices are in proximity, the acoustic signal 322 is picked up by the microphone 310. Acoustic feedback occurs because the acoustic signal 322 includes the speech signal 308, the microphone 310 feeds two copies of the speech signal 308 to the transmit audio path 314. This acoustic feedback can lead to howling.

The communications devices of FIG. 3 are configured to reduce acoustic feedback using adaptive filtering. A copy of the audio signal being transmitted (a reference signal 324) is used to estimate how the audio signal is fed back to the microphone 310. The estimated feedback signal is subtracted from the signal produced by the microphone to reduce the acoustic feedback. Although the reference signal 324 is similar to the acoustic signal 322 (in that they both include the speech signal 308), they are not identical. Loop delay, speaker impulse response (SIR), and room impulse response (RIR), among other things, affect the acoustic feedback signal. The loop delay is the delay that occurs between the transmission of the radio frequency signal 312 and the reception of the acoustic signal 322. Loop delay includes the bulk transmission delay (BTD) for the radio frequency signal 312, and the time it takes for the acoustic signal to travel from the speaker 320 to the microphone 310. Room impulse response and speaker impulse response determine how the characteristics of the acoustic environment (for example, a room in which the devices are operating) and the speaker affect the acoustic signal 322.

To generate an accurate estimated feedback signal, the adaptive filter 326 operates according to a model 328 and a delay 330. Although illustrated separately in this example, in some embodiments, the adaptive filter 326 is part of the model 328. The adaptive filter 326, the model 328, and the delay 330 attempt to compensate for the loop delay, speaker impulse response (SIR), and room impulse response (RIR). However, the loop delay can be large (compared to the timing involved in the steps of processing and transmitting audio signals), and it is unknown to the transmitting communication device 302. In addition, the room impulse response varies with time as one or both of the communication devices move through the acoustic environment, or the acoustic environment changes (for example, persons move through it). A static model may not be able to effectively estimate the feedback signal.

Figure 4:
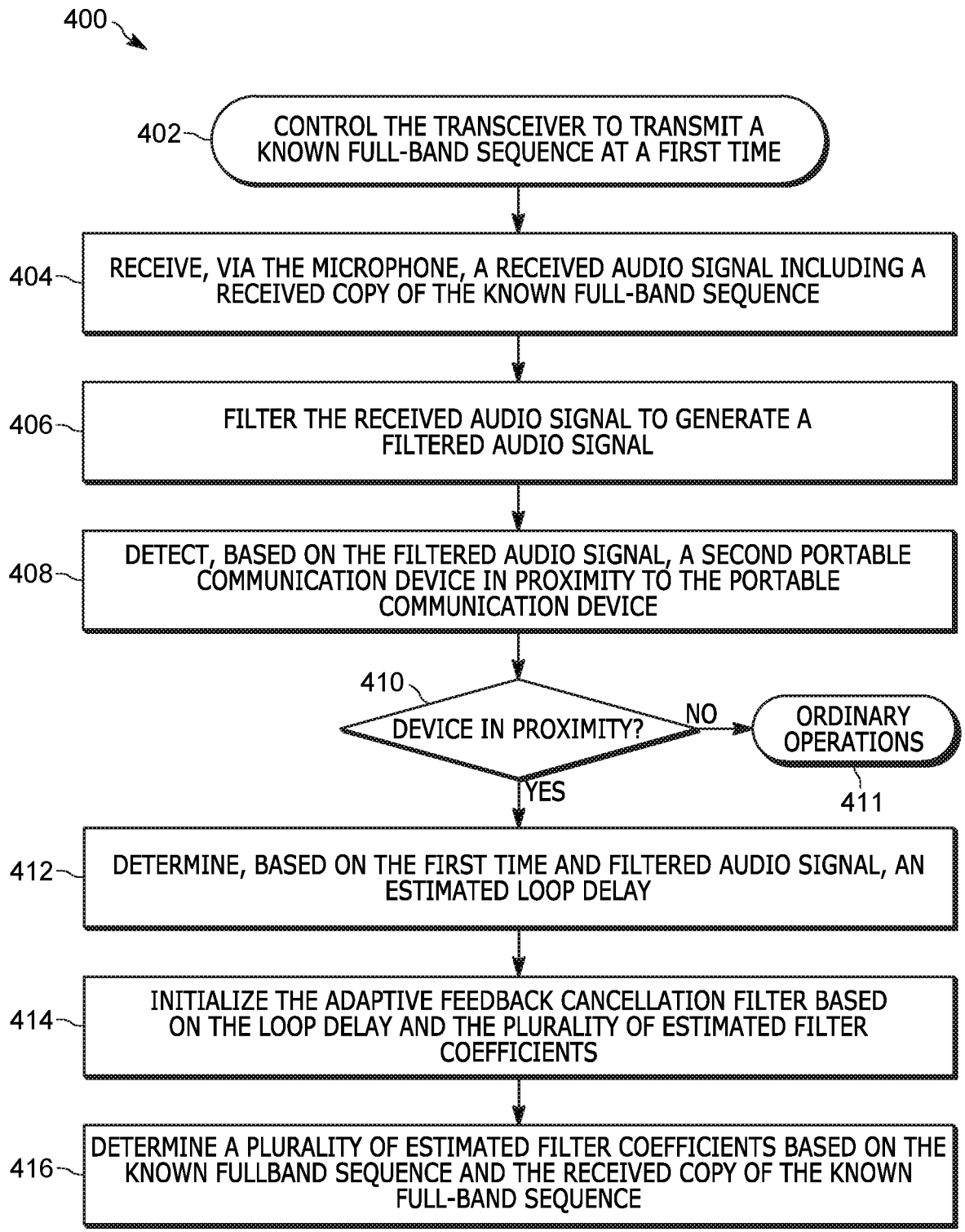
FIG. 4 is a flowchart of a method for acoustic feedback cancellation using a known full band sequence, in accordance with some embodiments.
Figure 5:
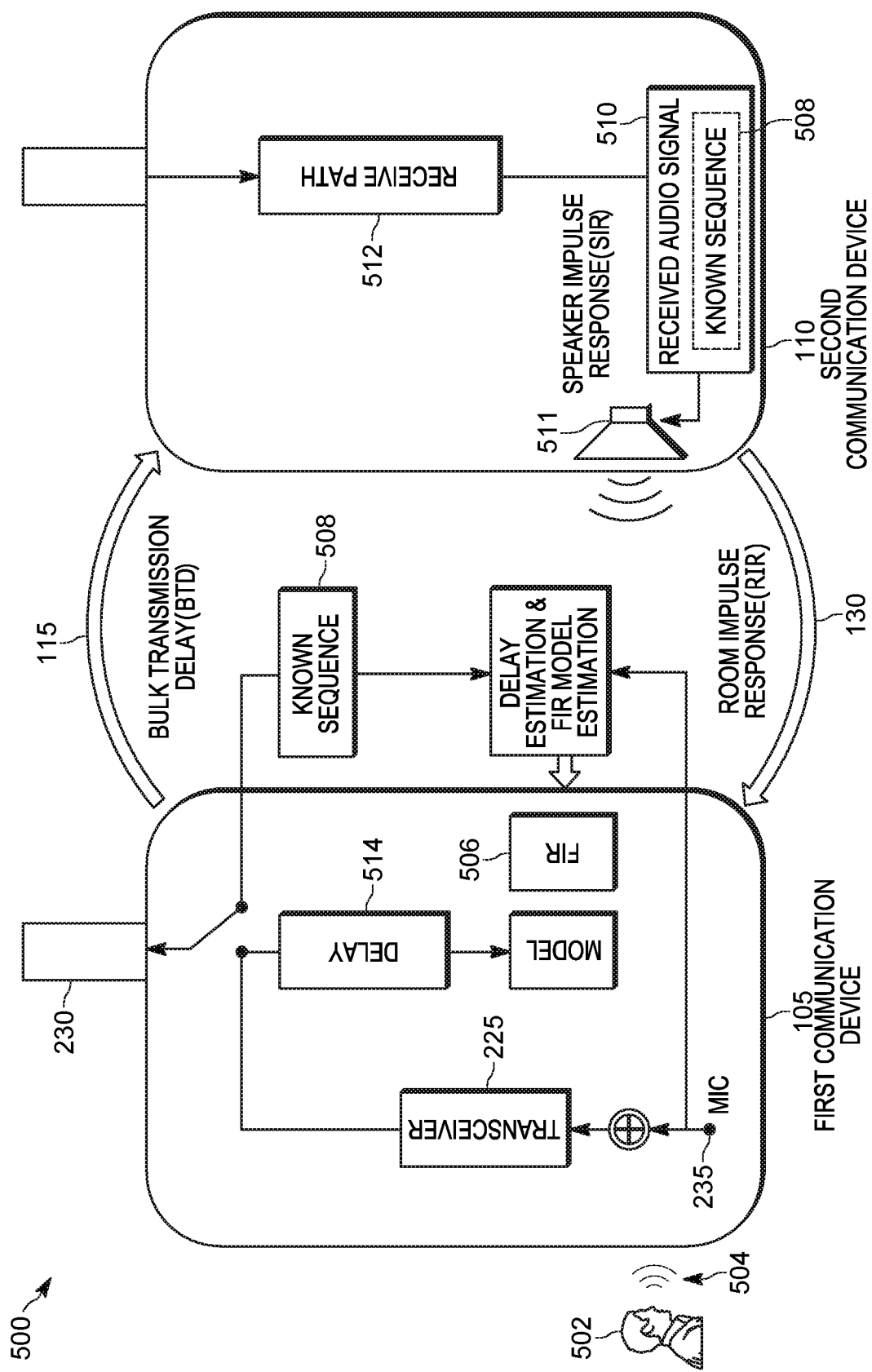
FIG. 5 is a diagram illustrating the operation of the method of FIG. 4, in accordance with some embodiments.

Accordingly, FIG. 4 illustrates an example method 400 for acoustic feedback cancellation using a known full band sequence. The method 400 is described with respect to FIG. 5, which illustrates a system 500. The system 500 is an embodiment of the system 100. As illustrated in FIG. 5, a device user 502 is operating the first communication device 105 to transmit audio (for example, a speech signal 504) to the second communication device 110. The first communication device 105 implements the method 400 to, among other things, train an adaptive feedback cancellation filter 506. The method 400 is described as being performed by the first communication device 105 and, in particular, the electronic processor 205. However, it should be understood that in some embodiments, portions of the method 400 may be performed by other devices, including for example, the second communication device 110 or another device included in the communication system 100.

Returning to FIG. 4, at block 402, the electronic processor 205 controls the transceiver 225 to transmit a known full-band sequence 508 at a first time. The known full-band sequence 508 is an audio sequence that is spread across substantially the full range of audio frequencies. In some embodiments, the known full-band sequence 508 is a full-band white Gaussian noise sequence. In some embodiments, the known full-band sequence 508 is 250 milliseconds in length.

In some embodiments, the first communication device 105 transmits the known full-band sequence 508 to train the adaptive feedback cancellation filter 506 at the start of an audio transmission. For example, the electronic processor 205 may receive an input indicative of a transmission command and control the transceiver 225 to transmit the known full-band sequence 508 in response to receiving the input. In some embodiments, the input may be the selection of push-to-talk selection mechanism 250. In some embodiments, the input could be a voice command or another suitable means of initiating an audio transmission.

As illustrated in FIG. 5, the known full-band sequence 508 is transmitted to the second communication device 110 via the radio frequency signal 115. The second communication device 110 receives the radio frequency signal 115 and decodes it into a received audio signal 510 using the receive path 512. The received audio signal 510 includes a received copy of the known full-band sequence 508. The received audio signal 510, including the received copy of the known full-band sequence 508, is broadcast by the loudspeaker 511 as the acoustic signal 130. The acoustic signal 130 is picked up by the microphone 235.

Returning to FIG. 4, at block 404, the electronic processor 205 receives, via the microphone 235, the received audio signal 510 including a received copy of the known full-band sequence 508.

Figure 6A:
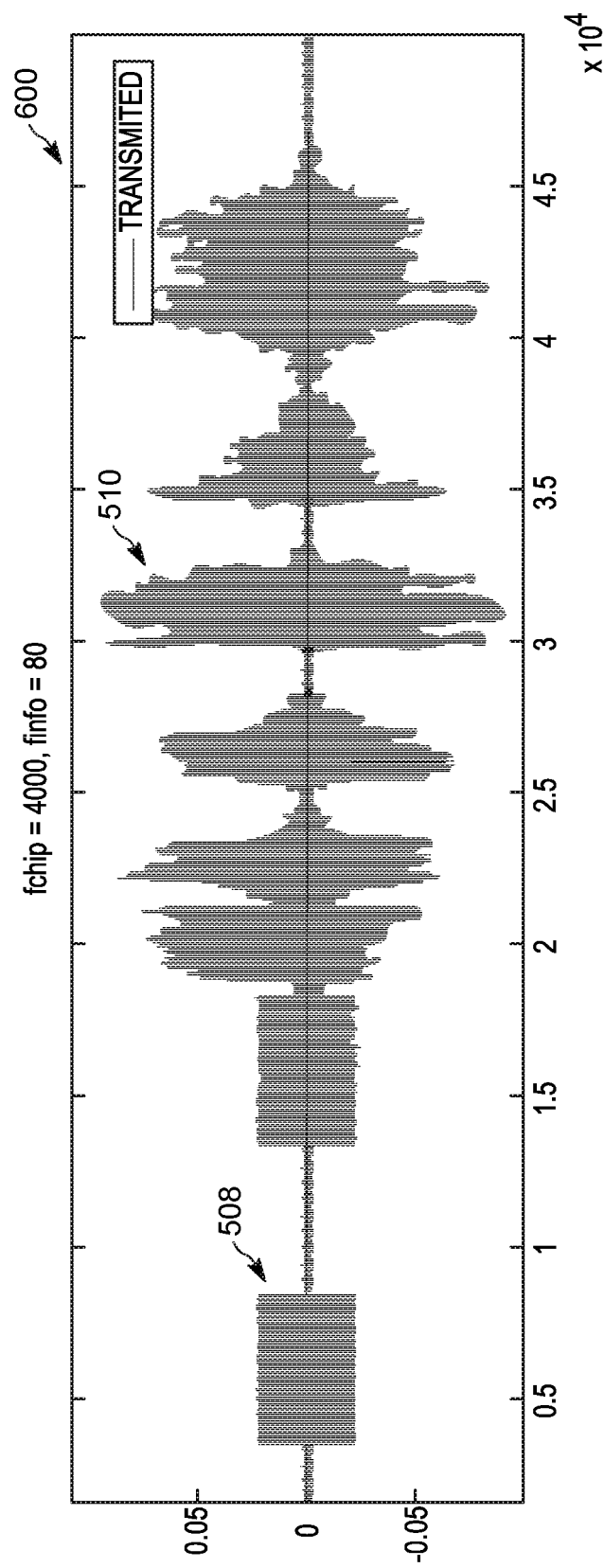
FIG. 6A is a line chart illustrating an example received audio signal including a known full band sequence, in accordance with some embodiments.
Figure 6B:
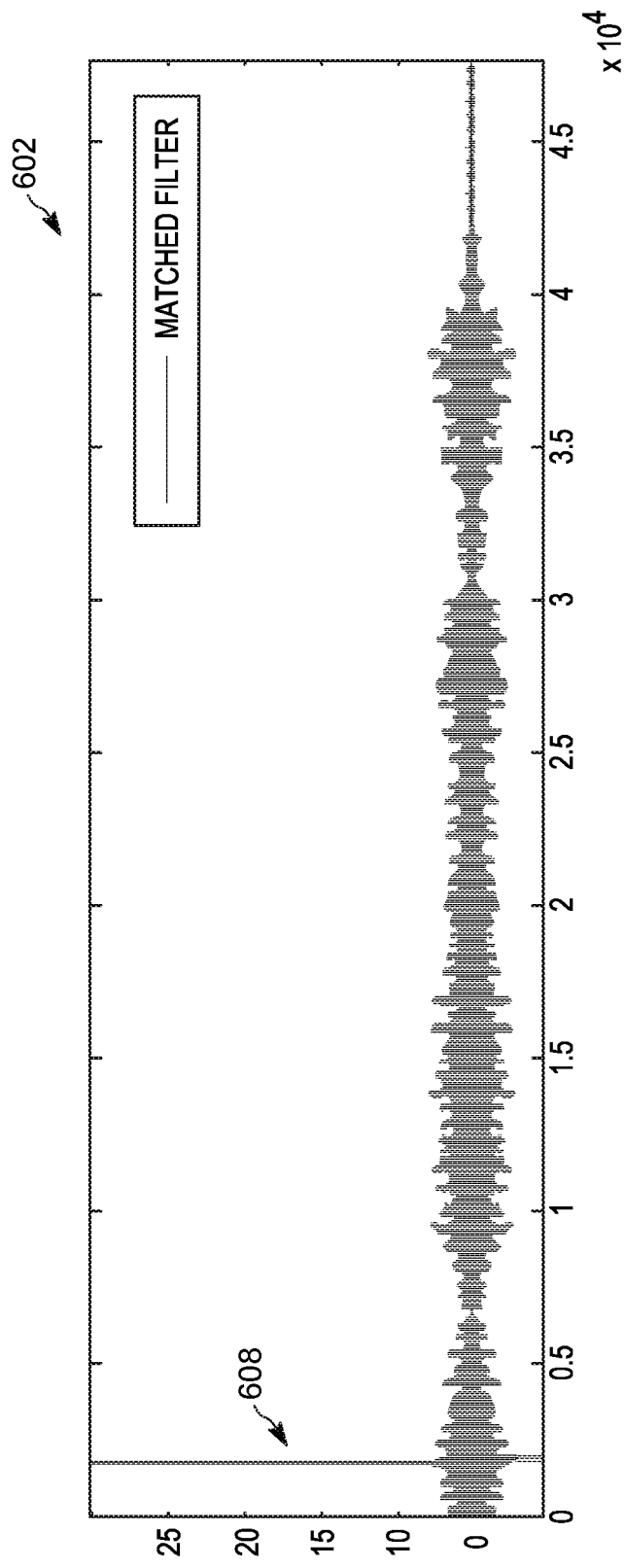
FIG. 6B is a line chart illustrating a filter output matched to a known full band sequence, in accordance with some embodiments.

At block 406, the electronic processor 205 filters the received audio signal 510 to generate a filtered audio signal. In some embodiments, the electronic processor 205 filters the received audio signal using a finite impulse response (FIR) filter matched to the known full-band sequence 508. The filtered audio signal can be used to detect the presence of the known full-band sequence 508 in the received audio signal 510. FIG. 6A is a line chart 600 illustrating an example of the received audio signal 510, including an example of the known full-band sequence 508. When the received audio signal 510 is filtered with a matched filter, the output (that is, the filtered audio signal) will show a prominent spike when the received copy of the known full-band sequence 508 is time-aligned with the coefficients of the matched filter. For example, FIG. 6B is a line chart 602 that illustrates the output of a filter matched to the known full-band sequence 508 of FIG. 6A, including a spike 604, which indicates the presence of the known full-band sequence 508. The matched filter decorrelates its input, so even high-energy audio does not generate a spike in the output of the matched filter. As illustrated in FIGS. 6A and 6B, the only signal that can generate the prominent spike is the known full-band sequence 508. In some embodiments, when signal energy varies over a wide range (that is, sometimes gets very high), an optional step is to normalize the matched filter output by the incoming signal power. This normalizing adds additional protection against high random spikes produced by high energy audio input.

Returning to FIG. 4, at block 408, the electronic processor 205 detects, based on the filtered audio signal, whether a second portable communication device is in proximity to the first communication device 105. In some embodiments, the electronic processor 205 detects the proximity of another device by detecting, in the filtered audio signal, a power spike corresponding to the received copy of the known full-band sequence 508 occurring at a second time (for example, spike 604 in FIG. 6B). In some embodiments, the electronic processor 205 detects the power spike by dividing the filtered audio signal into a plurality of portions. In some embodiments, the filtered audio signal is divided into 10 ms portions. For each of the 10 ms portions, the electronic processor 205 determines a power level. The electronic processor 205 compares the current power level to an average power level for a subset of the previous portions (for example, the previous five portions). In some embodiments, the electronic processor 205 identifies a power spike when the power level for the current portion exceeds the average power level by a predetermined threshold. For example, the electronic processor 205 may identify a power spike when the current power level is at least four times larger than the average power level for the past five portions.

In some embodiments, at block 410, when the electronic processor 205 does not detect a second portable communication device in proximity to the first communication device 105, the electronic processor 205 determines that howling is not a concern. As such, the method 400 ends and the first communication device 105 resumes ordinary operations (at block 411).

In response to detecting the proximity of the second communication device 110 (at block 410), the electronic processor 205 determines, based on the first time and filtered audio signal, an estimated loop delay (at block 412). In one example, the electronic processor 205 determines the estimated loop delay by comparing the first time (when the known full-band sequence 508 was transmitted) to the second time (when the power spike occurred in the filtered audio signal).

Figure 7A:
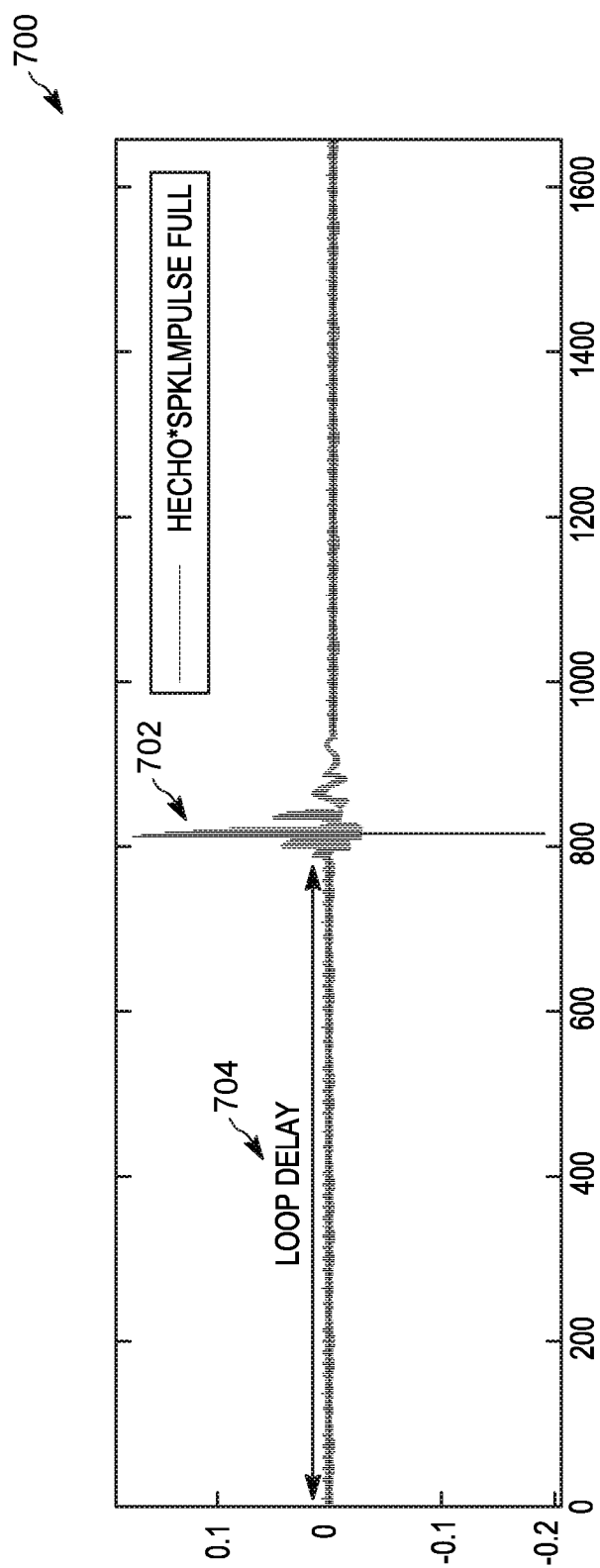
FIG. 7A is a line chart illustrating a filter including a loop delay, in accordance with some embodiments.
Figure 7B:
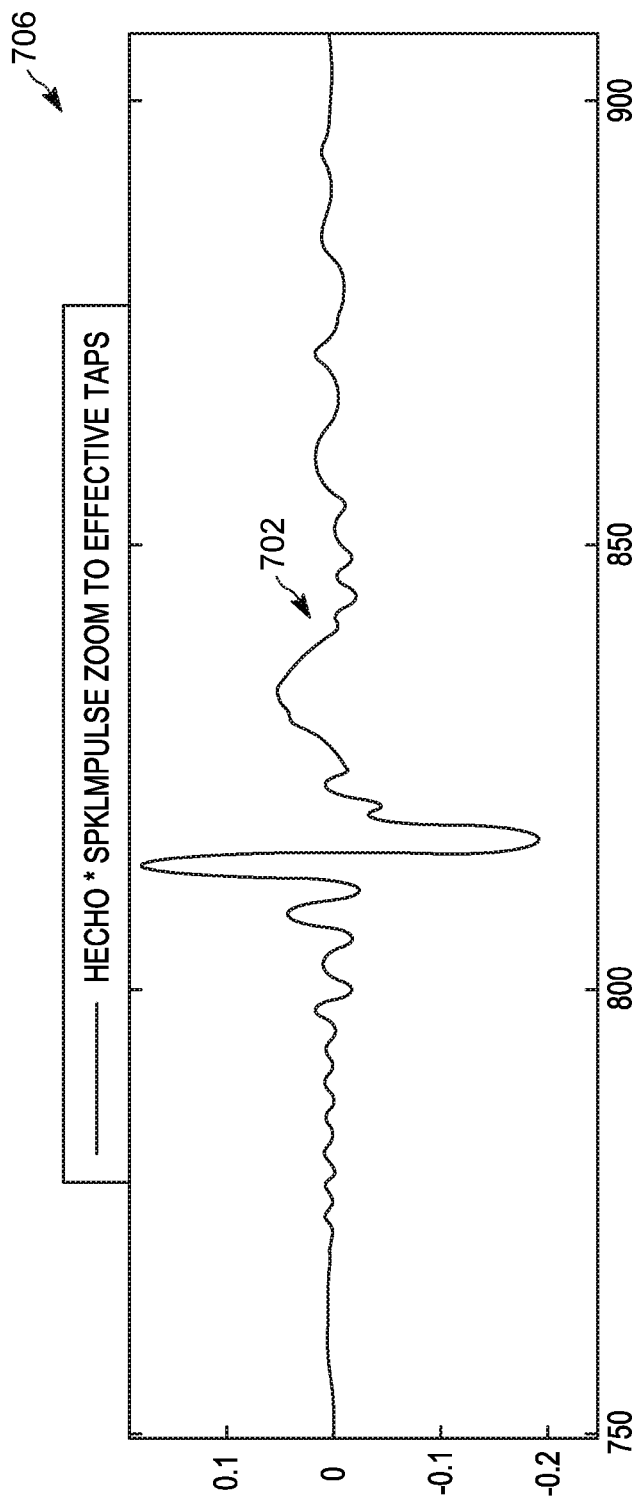
FIG. 7B is a line chart illustrating the filter of FIG. 7A reduced in size, in accordance with some embodiments.

At block 414, the electronic processor 205 initializes the adaptive feedback cancellation filter based on the estimated loop delay. A large loop delay can lead to a large filter length with many zero coefficients in the beginning to compensate for the delay. For example, FIG. 7A is a line chart 700, which shows a filter 702 including a loop delay 704. A filter of this length is, in general, too long to be realizable. As noted herein, the loop delay includes a bulk radio frequency transmission delay and an acoustic propagation delay. Because the bulk transmission delay is much larger than the acoustic propagation delay, the estimated loop delay may be used to estimate the bulk transmission delay. In some embodiments, the electronic processor 205 reduces the estimated bulk transmission delay by a small amount to account for the acoustic delay. The adaptive feedback cancellation filter is initialized by introducing a delay into the signal processing prior to the filter (see delay 514 in FIG. 5) and reducing the filter size to exclusively model the acoustic channel. FIG. 7B is a line chart 706, which shows the filter 702 reduced in size.

Figure 7C:
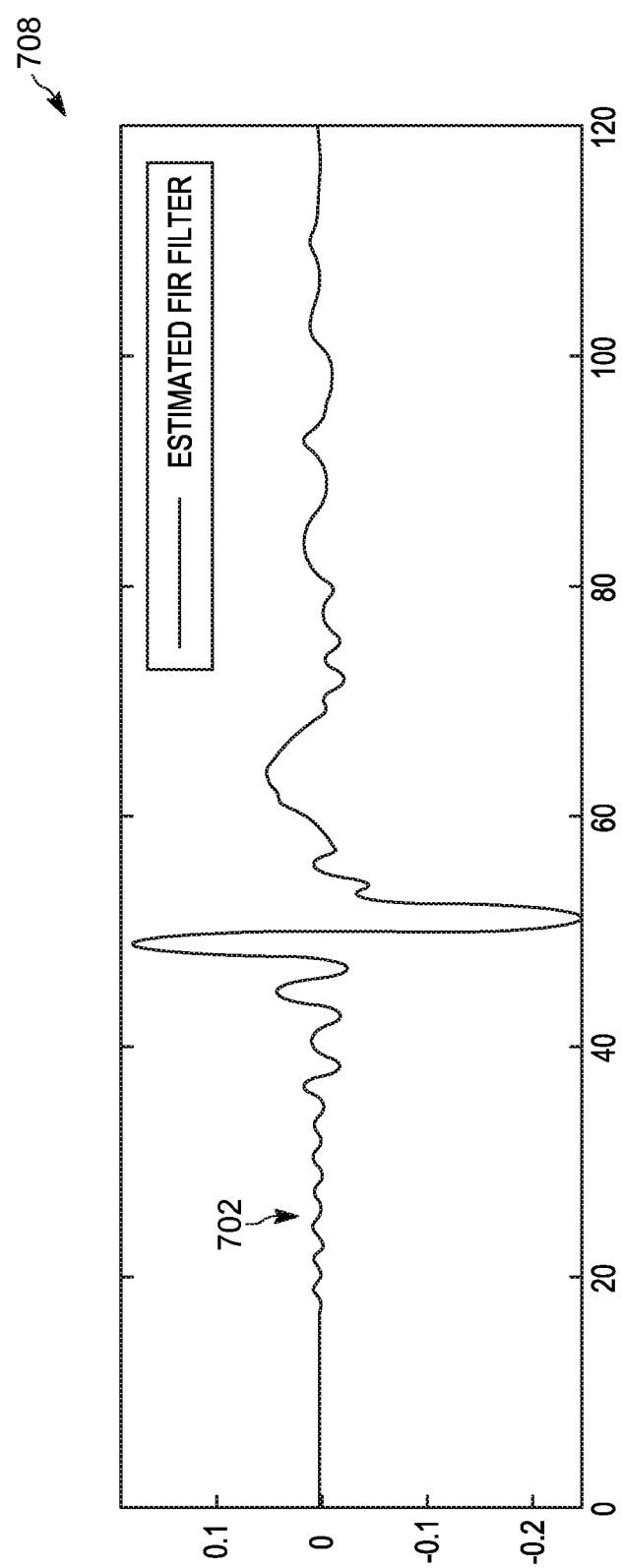
FIG. 7C is a line chart illustrating the filter of FIG. 7A reduced in size and trained using a plurality of coefficients, in accordance with some embodiments.

Returning to FIG. 4, at block 416, the electronic processor 205 trains the reduced adaptive feedback cancellation filter by determining a plurality of estimated filter coefficients based on the known full-band sequence 508 and the received copy of the known full-band sequence 508. For example, the original sequence (the known full-band sequence 508) and the detected sequence (the received copy of the known full-band sequence 508, time-aligned to the original sequence) are used to run the filter adaptation. The coefficients of the adaptive feedback cancellation filter 506 are adapted such that the adaptive feedback cancellation filter 506 converts a buffered copy of the local signal (produced by the microphone 235) to an acoustically altered copy of itself (received in the acoustic signal 130 by the microphone 235). Because there is reduced concern about correlation between the signals, the adaptation can be run at a high rate, allowing an effective estimate of the acoustic channel to be achieved more quickly (compared to using to a speech input and its corresponding acoustic feedback signal). In addition, the full-band nature of the known sequence produces coefficients that can effectively filter acoustic feedback across the audio frequency band. FIG. 7C is a line chart 708, which shows the filter 702 reduced in size and trained using the plurality of coefficients.

Figure 8:
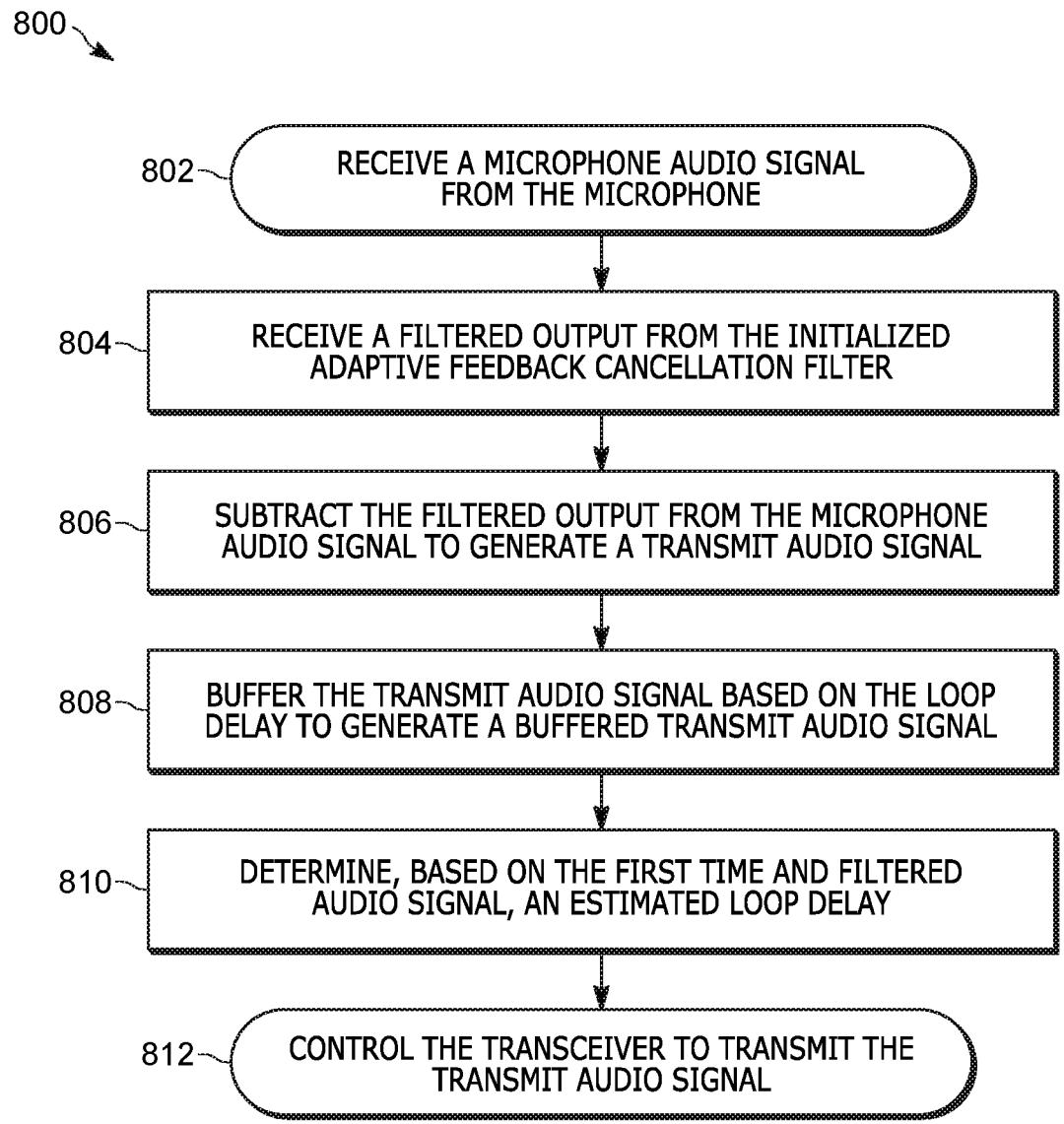
FIG. 8 is a flowchart of a method for acoustic feedback cancellation, in accordance with some embodiments.
Figure 9:
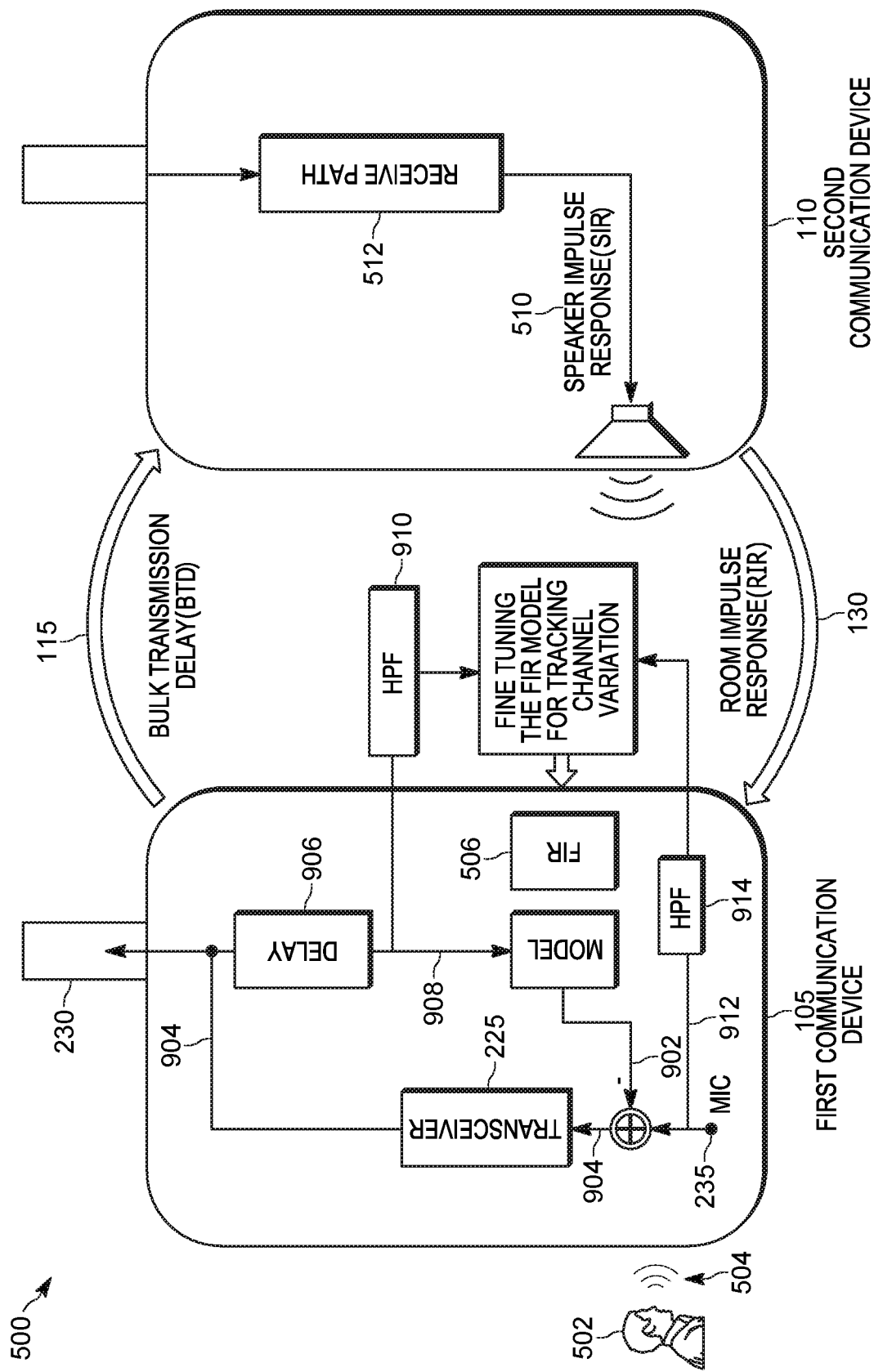
FIG. 9 is a diagram illustrating the operation of the methof of FIG. 8, in accordance with some embodiments.

In some embodiments, when the adaptive feedback cancellation filter 506 has been initialized and trained, the first communication device 105 operates the adaptive feedback cancellation filter 506 to continuously suppress acoustic feedback during the transmission of audio (for example, while a PTT transmission is occurring). For example, FIG. 8 illustrates an example method 800 for acoustic feedback cancellation. The method 400 is described with respect to the system 500, as illustrated in FIG. 9. The method 800 is described as being performed by the first communication device 105 and, in particular, the electronic processor 205. However, it should be understood that in some embodiments, portions of the method 800 may be performed by other devices, including for example, the second communication device 110 or another device included in the communication system 100.

At block 802, the electronic processor 205 receives a microphone audio signal from the microphone 235. For example, the microphone 235 receives the speech signal 504 and the acoustic signal 130 (see FIG. 9).

At block 804, the electronic processor 205 receives a filtered output 902 from the initialized adaptive feedback cancellation filter 506. The electronic processor 205 produces the filtered output 902 from a transmit audio signal 904, as described below.

At block 806, the electronic processor 205 subtracts the filtered output 902 from the microphone audio signal to generate the transmit audio signal 904.

At block 808, the electronic processor 205 buffers (for example, using the buffer 906) the transmit audio signal based on the loop delay to generate a buffered transmit audio signal 908.

At block 810, the electronic processor 205 routes the buffered transmit audio signal 908 to the initialized adaptive feedback cancellation filter 506.

At block 812, the electronic processor 205 controls the transceiver 225 to transmit the transmit audio signal 904.

In some embodiments, this process (at blocks 802-812) is repeated continuously until a PTT transmission ends.

Because the reference signal used during operation of the filter is a speech signal, it can show high inter-sample correlation. Such inter-sample correlation of the local signal may deceive the adaptive feedback cancellation filter 506 into removing parts of the local signal rather than the feedback signal. Accordingly, to mitigate the self-correlation, in some embodiments, the electronic processor 205 uses two high pass filters. For example, the electronic processor 205 filters the buffered transmit audio signal 908 with a first high pass filter 910 to generate a filtered buffered transmit audio signal. The electronic processor 205 filters the microphone audio signal 912 with a second high pass filter 914 to generate a filtered microphone audio signal. The electronic processor 205 adapts the initialized adaptive feedback cancellation filter 506 based on the filtered buffered transmit audio signal and the filtered microphone audio signal. In some embodiments, the first high pass filter 910 and the second high pass filter 914 are second order differentiators, which provide significant attenuation of lower frequencies that can be severely affected by the inter-sample correlation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communication device comprising:
a transceiver;
a microphone;
an adaptive feedback cancellation filter;
an electronic processor coupled to the transceiver, the microphone, and the adaptive feedback cancellation filter, and configured to
control the transceiver to transmit a known full-band sequence at a first time;
receive, via the microphone, a received audio signal including a received copy of the known full-band sequence;
filter the received audio signal to generate a filtered audio signal;
detect, based on the filtered audio signal, a second portable communication device in proximity to the portable communication device; and
in response to detecting the second portable communication device,
determine, based on the first time and filtered audio signal, an estimated loop delay;
initialize the adaptive feedback cancellation filter based on the estimated loop delay; and
determine a plurality of estimated filter coefficients based on the known full-band sequence and the received copy of the known full-band sequence.

2. The portable communication device of claim 1, wherein the electronic processor is configured to filter the received audio signal using a filter matched to the known full-band sequence.

3. The portable communication device of claim 1, wherein the electronic processor is configured to detect the second portable communication device in proximity to the portable communication device by detecting, in the filtered audio signal, a power spike corresponding to the received copy of the known full-band sequence occurring at a second time.

4. The portable communication device of claim 3, wherein the electronic processor is configured to detect a power spike by
dividing the filtered audio signal into a plurality of portions; and
for each of the plurality of portions,
determining a power level;
comparing the power level to an average power level for a subset of previous portions; and
identifying a power spike when the power level exceeds the average power level by a predetermined threshold.

5. The portable communication device of claim 3, wherein the electronic processor is configured to determine the estimated loop delay based further on the second time.

6. The portable communication device of claim 1, wherein the electronic processor is configured to
receive a microphone audio signal from the microphone;
receive a filtered output from the initialized adaptive feedback cancellation filter;
subtract the filtered output from the microphone audio signal to generate a transmit audio signal;
buffer the transmit audio signal based on the estimated loop delay to generate a buffered transmit audio signal;
route the buffered transmit audio signal to the initialized adaptive feedback cancellation filter; and
control the transceiver to transmit the transmit audio signal.

7. The portable communication device of claim 6, wherein the electronic processor is configured to
filter the buffered transmit audio signal with a first high pass filter to generate a filtered buffered transmit audio signal;
filter the microphone audio signal with a second high pass filter to generate a filtered microphone audio signal; and
adapt the initialized adaptive feedback cancellation filter based on the filtered buffered transmit audio signal and the filtered microphone audio signal.

8. The portable communication device of claim 1, wherein the electronic processor is further configured to:
receive an input indicative of a transmission command; and
control the transceiver to transmit a known full-band sequence at a first time in response to receiving the input.

9. The portable communication device of claim 8, further comprising:
a push-to-talk button;
wherein the electronic processor is coupled to the push-to-talk button, and configured to receive an input indicative of a transmission command by receiving an input selecting the push-to-talk button.

10. A method for acoustic feedback cancellation for a portable communication device, the method comprising:
transmitting, with a transceiver, a known full-band sequence at a first time;
receiving, via a microphone, a received audio signal including a received copy of the known full-band sequence;
filtering the received audio signal to generate a filtered audio signal;
detecting, based on the filtered audio signal, a second portable communication device in proximity to the portable communication device; and
in response to detecting the second portable communication device,
determining, with an electronic processor based on the first time and filtered audio signal, an estimated loop delay;
initializing an adaptive feedback cancellation filter based on the estimated loop delay; and
determining, with the electronic processor, a plurality of estimated filter coefficients based on the known full-band sequence and the received copy of the known full-band sequence.

11. The method for acoustic feedback cancellation of claim 10, wherein filtering the received audio signal includes filtering the received audio signal with a filter matched to the known full-band sequence.

12. The method for acoustic feedback cancellation of claim 10, wherein detecting the second portable communication device in proximity to the portable communication device includes detecting, in the filtered audio signal, a power spike corresponding to the received copy of the known full-band sequence occurring at a second time.

13. The method for acoustic feedback cancellation of claim 12, wherein detecting a power spike includes:
dividing the filtered audio signal into a plurality of portions; and
for each of the plurality of portions,
determining a power level;
comparing the power level to an average power level for a subset of previous portions; and
identifying a power spike when the power level exceeds the average power level by a predetermined threshold.

14. The method for acoustic feedback cancellation of claim 12, wherein determining the estimated loop delay includes determining the estimated loop delay based further on the second time.

15. The method for acoustic feedback cancellation of claim 10, further comprising:
receiving a microphone audio signal from the microphone;
receiving a filtered output from the initialized adaptive feedback cancellation filter;
subtracting the filtered output from the microphone audio signal to generate a transmit audio signal;
buffering the transmit audio signal based on the loop delay to generate a buffered transmit audio signal;
routing the buffered transmit audio signal to the initialized adaptive feedback cancellation filter; and
transmitting the transmit audio signal with the transceiver.

16. The method for acoustic feedback cancellation of claim 15, further comprising:
filtering the buffered transmit audio signal with a first high pass filter to generate a filtered buffered transmit audio signal;
filtering the microphone audio signal with a second high pass filter to generate a filtered microphone audio signal; and
adapting the initialized adaptive feedback cancellation filter based on the filtered buffered transmit audio signal and the filtered microphone audio signal.

17. The method for acoustic feedback cancellation of claim 10, further comprising:
  receive, with the electronic processor, an input indicative of a transmission command; and
  transmitting, with the transceiver, a known full-band sequence at a first time in response to receiving the input.

18. The method for acoustic feedback cancellation of claim 17, wherein receiving an input indicative of a transmission command includes receiving an input selecting a push-to-talk button.

* * * * *